(No Model.) 2 Sheets—Sheet 1.
H. SOMMERFELD.
GANG PLOW.
No. 550,651. Patented Dec. 3, 1895.
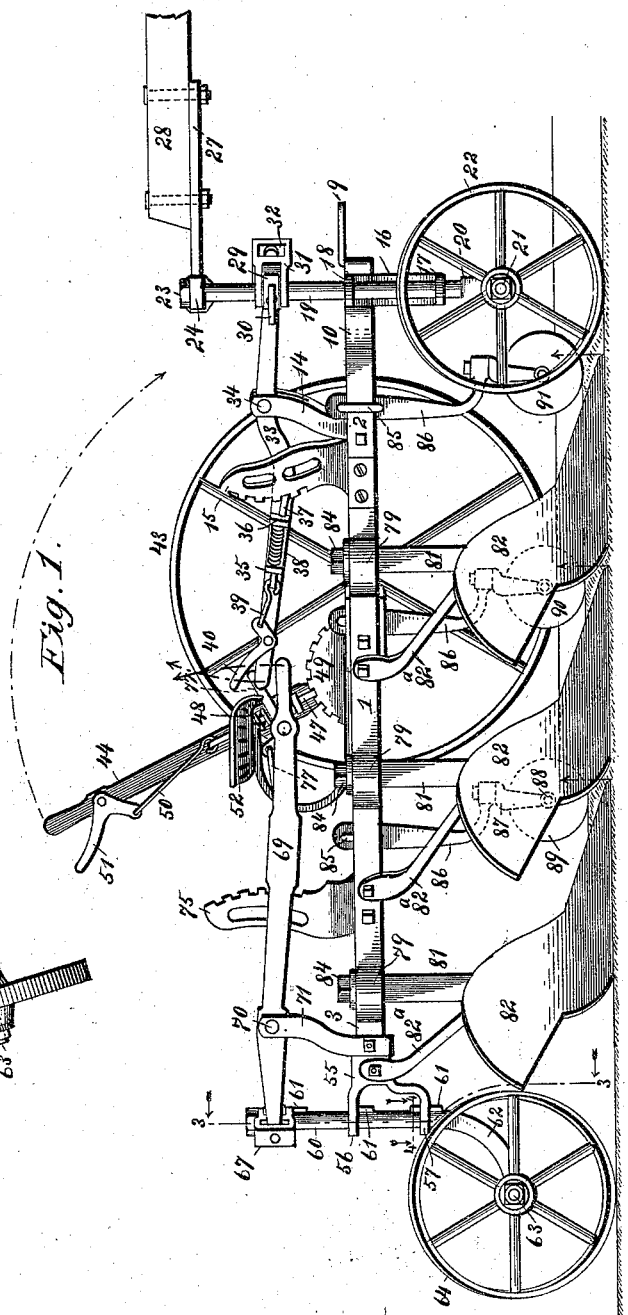
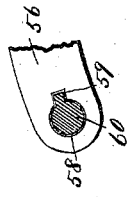
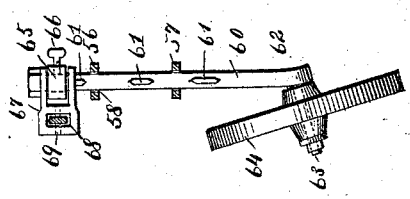
Witnesses:
F. G. Fischer
C. W. Thorpe
Inventor:
Heinrich Sommerfeld
By Higdon & Higdon
Attys.

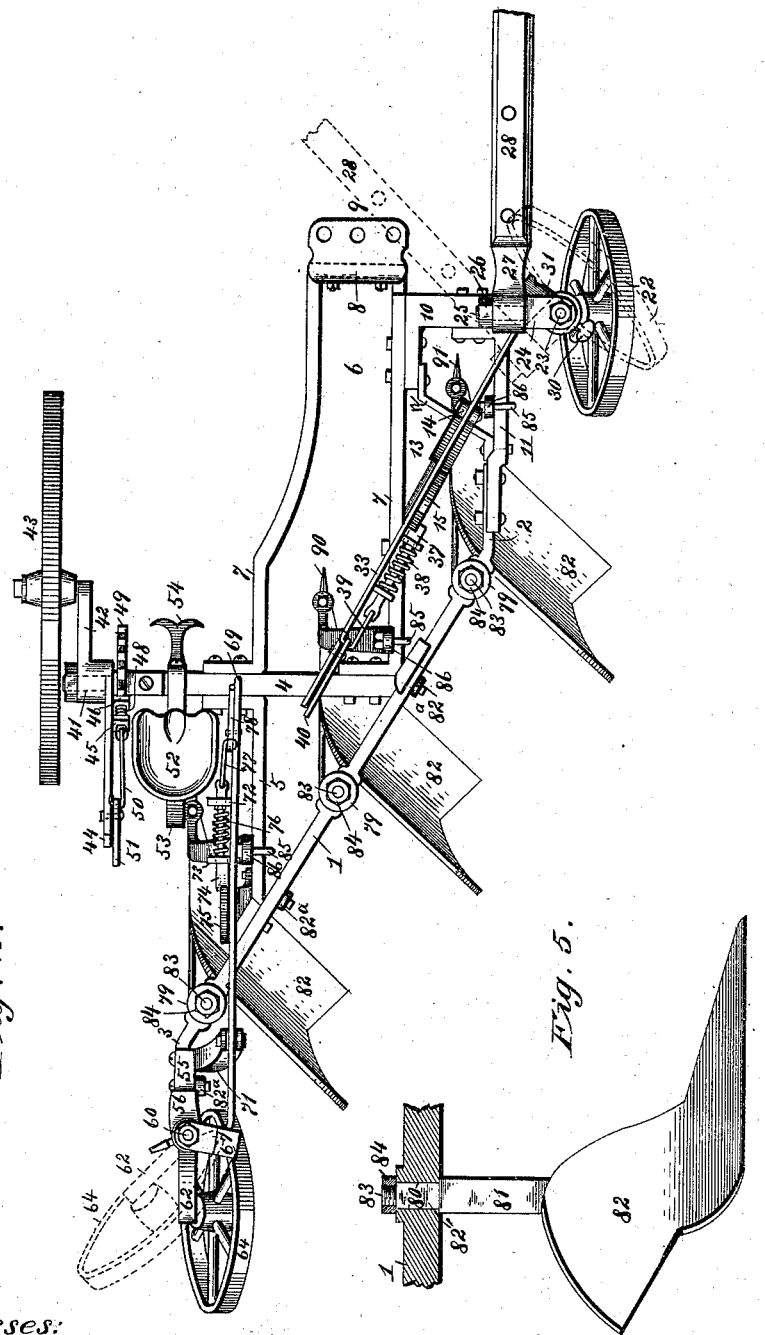

UNITED STATES PATENT OFFICE.

HEINRICH SOMMERFELD, OF CANTON, ASSIGNOR OF ONE-HALF TO KARL EHRLICH, OF LEHIGH, KANSAS.

GANG-PLOW.

SPECIFICATION forming part of Letters Patent No. 550,651, dated December 3, 1895.

Application filed July 13, 1894. Serial No. 517,417. (No model.)

*To all whom it may concern:*

Be it known that I, HEINRICH SOMMERFELD, of Canton, McPherson county, Kansas, have invented certain new and useful Improvements in Gang-Plows, of which the following is a full, clear, and exact description, reference being had to the accompanying drawings, forming a part hereof.

My invention relates to gang-plows, and has for its object to produce a construction wherein two wheels, the front and the guide-wheel or trailer, travel in furrows and the large wheel upon hard or unbroken ground; wherein each wheel is vertically and independently adjustable, so that the framework carrying the plows may be raised or lowered; wherein the front wheel and the guide or trailer are rotatably mounted to allow the plow to be turned either to the right or to the left, and wherein means are provided to prevent the turning of the guide-wheel or trailer, so that the machine shall travel in a direct line; furthermore, to provide a gang-plow of exceedingly-light draft, which is strong, durable, and comparatively inexpensive of construction.

With these objects in view the invention consists in certain novel and peculiar features of construction and combinations of parts, as hereinafter described and claimed.

In order that the invention may be fully understood, reference is to be had to the accompanying drawings, in which—

Figure 1 is a side elevation of a gang-plow embodying my invention. Fig. 2 is a top plan view of the same. Fig. 3 is a vertical sectional view taken on the line 3 3 of Fig. 1. Fig. 4 is a horizontal sectional view enlarged, taken on the line 4 4 of Fig. 1. Fig. 5 is a vertical sectional view of the plow-beam to show the manner of attaching the plows thereto.

In the said drawings, 1 designates the plow-beam of the frame, which extends obliquely to the left rearwardly and at its opposite ends is bent to form the parallel portions 2 and 3. Extending transversely to the left from and bolted to the obliquely-arranged plow-beam and a suitable distance from its front end and at right angles to the parallel portions 2 and 3 thereof is the beam 4, and this beam is braced and supported near its outer end by the longitudinal bar 5, which is secured at its opposite ends to said beam and to the plow-beam. An approximately U-shaped frame 6 is longitudinally and horizontally arranged and has the rear ends of its arms 7 bolted to the front side of the transverse beam 4, and mounted upon the transverse or bridge portion of this U-shaped frame is a plate 8, having a transversely-extending series of holes or apertures 9, one or the other of which is adapted to receive the bolt securing the clevis (not shown) to said plate. By this construction it will be apparent that the draft upon the plow may be adjusted laterally. Bolted firmly to and projecting laterally from said frame and to the right is a beam 10, and this beam about midway its length is in turn connected rigidly to the front portion 2 of the plow-beam by means of the bar 11. Extending obliquely to the left and forward and bolted rigidly at its opposite ends to the bar 11 and to the beam 10 is a bar 12, and projecting rearwardly and at right angles to said bar 12 is a brace-bar 13, which may be cast integral with the bar 12 or not, as desired, and this brace-bar 13, at its rear end, is bolted to the adjacent side or arm of the frame 6. A slotted standard 14 projects upwardly from the junction-point of the brace-bar 13, with the bar 12, and secured to and projecting vertically upward from the bar 13, in the rear of the standard 14, is a notched segment or sector 15, the notched surface of which is arranged concentric with the axial line of apertures in the upper end of said slotted standard. Bolted rigidly to and depending from the under side of the transverse beam 10 is an angle-bracket, which is provided at its lower end with a horizontal arm 16, and said horizontal arm, and also the outwardly-projecting end of the beam 10, are provided with vertically-aligned cylindrical apertures 17 and 18, respectively, in which is rotatably mounted the cylindrical standard 19. This standard a suitable distance from its lower end is enlarged to form the horizontal shoulder 20, which limits the downward movement of the plow-frame, and projecting from the lower end of said standard is a cylindrical stud 21, upon which is journaled in the ordinary manner the wheel 22. Secured rigidly upon the upper end of the standard 19 by the clamping-nut 23 and projecting diametrically opposite to the stud 21 is an arm 24, and mounted rotatably upon the reduced and cylindrical portion 25 of said arm and secured from displacement thereon by the nut 26 is a plate 27, which operates in a vertical plane, and bolted at its rear end upon said plate is the tongue 28. A collar 29 fits and is secured rigidly at any required point upon the standard 19 between the beam 10 and the arm 24 by the set-screw 30, and embracing the upper and lower sides of said collar and rotatably mounted upon said standard to operate in a horizontal plane are the arms of a casting or bracket 31, and this casting or bracket is provided with a vertically-elongated aperture 32, in which is pivotally mounted to operate in a vertical plane the forward end of the lever 33, said lever being pivotally mounted at a suitable point upon the bolt 34, mounted in the apertures in the upper end of the standard 14, hereinafter referred to. Projecting laterally from said lever and a suitable distance apart are the lugs 35 and 36, and longitudinally adjustable in said lugs is the dog 37, actuated by the spring 38 at all times to engage one or the other of the notches in the segment 15. The dog 37 is connected by the link 39 with the bell-crank lever 40, pivotally carried by and near the free end of the lever 33.

From the foregoing it will be apparent that the operation of the lever 33, owing to its fixed fulcrum in the bracket or casting 31, will cause the front end of the framework to move upward or downward upon the standard 19, and it will furthermore be apparent that the adjustment of the collar 29 upon the said standard will vary the vertical adjustment of the framework—that is, when the collar 29 is secured at its highest point of adjustment upon the standard 19 the same amount of lever movement will raise or elevate the framework a greater distance than when the collar is secured at a lower point upon said standard, thereby makingt he fulcrum-point of said lever vertically adjustable.

Mounted rotatably upon the cylindrical and reduced end of the beam 4 and retained in place by a nut is an arm 42, which is provided at its free end with a cylindrical stud, upon which is mounted in the ordinary manner the wheel 43. Projecting from the hub portion of and at right angles or thereabout to the arm 42 is the lever-arm 44, and projecting inwardly from said arm and a suitable distance apart are the lugs 45 and 46. Adjustably mounted in said lugs is a dog 47, which is actuated by a spring 48 to always engage one or the other of the notches in the segment 49, carried rigidly by and projecting vertically upward from the beam 4. A link-rod 50 pivotally connects the dog 47 with the bell-crank lever 51, pivotally mounted upon and near the free end of the lever 44. The seat 52 is located adjacent to the inner side of the lever 44 and is mounted upon the upper end of the supporting-spring 53, which is bolted or otherwise rigidly secured upon the beam 4, and projecting forwardly from the lower end thereof is the foot-rest 54 for the driver. Bolted rigidly upon the rear end of the portion 3 of the plow-beam is a bracket 55, and said bracket is forked to form the rearwardly-projecting and parallel arms 56 and 57, and these arms are provided with the vertically-aligned and circular apertures 58, and the inner margins of said apertures are notched, as shown at 59. The cylindrical standard 60 is rotatably mounted in the vertically-aligned apertures 58, which provide an extended bearing for said standard because of the distance between the arms 56 and 57, and this standard is provided at its front side with the vertically-aligned lugs 61, there being three of these lugs, so that two of the same may engage the notches 59 at the same time and thereby prevent any rotatable movement of the standard 60 in the bearing-apertures 58. The lower end of the standard 60 is preferably curved downwardly, as shown at 62, and projecting from said arm and at right angles to the disposition of the lugs 61 is the cylindrical stud 63, upon which is rotatably mounted and secured in the ordinary manner the guide-wheel or trailer 64. Mounted upon the standard 60, above the uppermost lug 61, is the collar 65, and said collar is secured in position by the set-screw 66. A bracket or casting 67 has its horizontal arms rotatably embracing the standard 60 at the upper and lower sides of the collar 65 and is provided with a vertically-elongated aperture 68, in which is pivotally mounted, to operate in a vertical plane, the rear end of the lever 69, said lever being pivotally mounted upon the bolt 70 in the upper end of the slotted standard 71, which is bolted rigidly to and projects upwardly from the bracket 55, carried by the portion 3 of the plow-beam.

Projecting laterally from the lever 69 are the lugs 72 and 73, and mounted adjustably in said lugs is the dog 74, which is forced to engage at all times one or the other of the notches of the segment or sector 75, carried rigidly by and projecting upwardly from the framework and arranged concentric to the pivotal point 70 of said lever by the spring 76. A link-rod 77 pivotally connects the dog 74 with the bell-crank lever 78, carried by the lever 69, near its free end. It will be apparent by the operation of this lever, which fulcrums in the casting or bracket 67, that the rear end of the framework will be raised or lowered and that when the notches 59 are in engagement with the lugs 61 the wheel 64 will be compelled to travel and guide the machine in a direct line. It will be furthermore apparent that when said lugs and notches are disengaged the guide-wheel 64 is free to turn to the right or to the left, so that as the front wheel 22 also turns in either direction the machine may be turned quickly and easily and in the shortest possible space. At regular intervals the plow-beam 1 is laterally enlarged, as shown at 79, and said enlargements are provided with the vertical and rectangular openings 80. The standards 81, carrying the plows 82 of the ordinary construction and braced by the inclined bars 82ª, are reduced at their upper ends to form shoulders which bear against the under side of the plow-beam and rectangular portions 82', which fit snugly within the rectangular openings 80 of the plow-beam, and projecting vertically from the upper end of the said portions 82' are the cylindrical and threaded studs 83, which are engaged by the clamping-nuts 84, which bear upon the upper side of said plow-beam and hold the standard firmly in position. The rearmost plow 82 has its point in longitudinal alignment with the tread of the guide-wheel 64, and the lateral distance between the rearmost and the middle plow or between the middle plow and the foremost plow is exactly equal to the lateral distance between the point of the foremost plow and the center of the tread of the foremost wheel 22. It will therefore be apparent that said wheel 22 and also the wheel 64 will travel at all times in the furrows and that the wheel 43 will travel always upon hard or unbroken ground. Secured by the clip 85 upon the longitudinal brace-bar 5 and depending therefrom is a standard 86, and this standard at its lower end carries, to rotate in a horizontal plane, the casting 87, and rotatably mounted upon the pin 88 in the lower end of said casting is the sod-cutting disk or colter-wheel 89, said wheel being arranged slightly in advance and above the point of the rearmost plow 82. The colter-wheel 90 is similarly carried by a standard 86 in advance and above the point of the middle plow, and said standard is secured at its upper end to the rear end of one of the arms 7 of the frame 6, and the colter 91 is also similarly carried by a standard 86 in advance and above the point of the foremost plow, and said standard is secured to and depends from the bar 11 of the framework.

When traveling to or from the field, the levers 33, 44, and 69 are operated so as to support the plows a suitable distance above the ground. In the practical operation of the machine these levers are operated so as to lower the framework sufficiently to plow to the required depth and the lever 69 so that the notches 59 shall engage the lower pair of the lugs 61, which are of considerable length, so as to allow of a varying depth of cut. The machine being drawn across the field by the draft-animals, which are preferably four in number, three being attached at the left of the tongue and one at the right, the parallel furrows are made in the ordinary manner, and the trailer or guide-wheel travels in the furrow made by the rearmost plow. When the end of the field is reached, the lever 69 is operated so as to disengage the said notches and lugs that the plow may be easily turned, and upon the second and all the succeeding trips across the field in the same direction the wheel 22 will travel in the furrow made by the rearmost plow upon the previous trip, and the wheel 43, always traveling upon the hard or unbroken ground, relieves the the draft-animals of a great deal of work which they undergo with plows wherein one or more wheels travel upon the loose or broken ground.

From the above description it will be apparent that I have produced a plow which embodies all the advantages of construction and operation set forth in the statement of invention, and which, by absolutely preventing the guide-wheel from turning, insures a straight furrow, and by which a great amount of work may be accomplished in a day, because the draft-animals have no unnecessary friction or impediments in the shape of wheels traveling upon loose or broken ground to overcome.

Having thus described my invention, what I claim as new, and desire to secure by Letters Patent, is—

1. In a gang-plow, the combination, as hereinbefore set forth, with a plow-carrying framework, a wheel adjustably supporting one side of said framework, and a wheel traveling in a furrow and adjustably supporting the opposite side and front end of said framework, of a guide-wheel or trailer also traveling in a furrow, a vertical and cylindrical standard carrying said wheel, and lugs projecting from the same, arms projecting from and forming a part of the framework, and having cylindrical bearing apertures engaging the cylindrical standard, and also having notches communicating with said apertures, and means to vertically adjust the rear end of the framework so that said notches shall engage certain of said lugs, and thereby prevent the rotation of said standard in its bearings.

2. In a gang-plow, the combination with a suitable framework, having vertical rectangular openings, of plow-carrying standards having their upper ends reduced and forming rectangular portions which fit snugly in said rectangular openings, and provided also with threaded portions projecting vertically upward from said rectangular portions, and nuts engaging said threaded portions each clamping the upper end of the body or larger portion of a standard firmly against the under side of the framework, substantially as set forth.

In testimony whereof I affix my signature in presence of two witnesses.

HEINRICH SOMMERFELD.

Witnesses:
M. R. REMLEY,
F. G. FISCHER.